US012670801B2

(12) United States Patent
Wang

(10) Patent No.: US 12,670,801 B2
(45) Date of Patent: Jun. 30, 2026

(54) INTERACTIVE PLATFORM SYSTEM AND EDUCATIONAL METAVERSE INTERACTIVE PLATFORM SYSTEM

(71) Applicant: NATIONAL UNIVERSITY OF KAOHSIUNG, Kaohsiung City (TW)

(72) Inventor: Zheng-Hong Wang, Tainan City (TW)

(73) Assignee: NATIONAL UNIVERSITY OF KAOHSIUNG, Kaohsiung City (TW)

( * ) Notice: Subject to any disclaimer, the term of this patent is extended or adjusted under 35 U.S.C. 154(b) by 0 days.

(21) Appl. No.: 19/000,759

(22) Filed: Dec. 24, 2024

(65) Prior Publication Data

US 2026/0080787 A1     Mar. 19, 2026

(30) Foreign Application Priority Data

Jul. 23, 2024    (TW) ................................ 113127527

(51) Int. Cl.
| | |
|---|---|
| *G09B 5/02* | (2006.01) |
| *G06T 11/00* | (2026.01) |
| *H04L 9/40* | (2022.01) |

(52) U.S. Cl.
CPC ................ *G09B 5/02* (2013.01); *G06T 11/00* (2013.01); *H04L 63/0861* (2013.01)

(58) Field of Classification Search
CPC .................................... G09B 5/00; G09B 5/02
See application file for complete search history.

(56) References Cited

U.S. PATENT DOCUMENTS

| | | | | |
|---|---|---|---|---|
| 8,824,749 | B2 * | 9/2014 | Leyvand ................ | G06F 21/32 |
| | | | | 382/104 |
| 11,090,568 | B1 * | 8/2021 | Mattar .................... | A63F 13/63 |
| 11,410,570 | B1 * | 8/2022 | Yang ....................... | G06T 17/20 |
| 2006/0005035 | A1 * | 1/2006 | Coughlin ................ | G06F 21/35 |
| | | | | 713/182 |
| 2008/0252637 | A1 * | 10/2008 | Berndt .................... | G06T 19/00 |
| | | | | 345/419 |
| 2009/0217171 | A1 * | 8/2009 | Hamilton, II .......... | G06Q 30/02 |
| | | | | 715/736 |
| 2010/0151431 | A1 * | 6/2010 | Miller ..................... | G09B 5/00 |
| | | | | 434/350 |
| 2017/0080346 | A1 * | 3/2017 | Abbas ..................... | A63F 13/79 |
| 2019/0164444 | A1 * | 5/2019 | Bramlet .................. | G09B 7/02 |
| 2021/0084259 | A1 * | 3/2021 | Kies ....................... | A63F 13/655 |
| 2022/0261936 | A1 * | 8/2022 | Kosarek ................. | G06Q 50/01 |

* cited by examiner

*Primary Examiner* — Robert J Utama
(74) *Attorney, Agent, or Firm* — WPAT, PC

(57) ABSTRACT

An interactive platform system, which can be applied in a metaverse environment or an educational field, for solving the problem that the functionality of conventional platform system is limited. The interactive platform system includes a communication scene which has a public area and a limited area within the public area defined in an interface arrangement of the communication scene. When a virtual character of a user is in the public area, an information transmitted by the user is public, and when the virtual character of the user is in the limited area, the information transmitted by the user is only receivable by corresponding virtual characters of other users who are in the limited area at the same time. An educational metaverse interactive platform system is also provided.

10 Claims, 6 Drawing Sheets

INTERACTIVE PLATFORM SYSTEM AND EDUCATIONAL METAVERSE INTERACTIVE PLATFORM SYSTEM

CROSS REFERENCE TO RELATED APPLICATION

The application claims the benefit of Taiwan application serial No. 113127527, filed on Jul. 23, 2024, and the entire contents of which are incorporated herein by reference.

BACKGROUND OF THE INVENTION

1. Field of the Invention

The present invention relates to an interactive platform system and, more particularly, to an interactive platform system that may be applied on a metaverse environment and an educational metaverse environment.

2. Description of the Related Art

Along with the technological advancement, multiple software, hardware, systems and platforms that may implement metaverse virtual world scenes have been proposed, put into practice and have become more mature nowadays. In comparison with meetings, lectures and chats on video calls, researches show that activities in metaverse scenes may increase the participation and focus level of users effectively. Nevertheless, these kinds of interactive platform system may be too single-functional or incomplete. For example, the same scene possesses merely one single function, or the object information between different interactive platforms may not be interconnected, leading to the lack of convenience and support.

In light of the above, it is necessary to improve the conventional interactive platform systems.

SUMMARY OF THE INVENTION

To solve the above problems, it is an objective of the present invention to provide an interactive platform system that can achieve fast conversion between the respective functions of public and non-public communication.

It is another objective of the present invention to provide an interactive platform system that can achieve association and conversion of personal data corresponding to the same user between different platform systems.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling" throughout the present invention includes direct or indirect electrical and/or signal connections, which may be selected by a person with ordinary knowledge in the art based on usage requirements.

As used herein, the terms "system", "device", "unit", "database" and "module" described throughout the present invention may collectively or individually include at least one "processor". The processor refers to various data processing devices with specific functions and implemented by hardware or a combination of hardware and software to process or analyze information and/or correspondingly generate control information. In addition, a corresponding data receiving or transmitting unit may be included to receive or transmit required data. In addition, a corresponding database or storage unit (especially a non-transient memory unit) may be included for reading and storing corresponding data. In particular, unless otherwise specifically excluded or contradicted, the processor may be a collection of multiple processors in an architecture based on a distributed system, which is used to include or represent processes, a mechanisms and results of information streaming among the multiple processors.

As used herein, elements including "system", "device", "unit", "database" and "module" described throughout the present invention have a mechanism for mutually transmitting and/or receiving signals, which is based on the corresponding hardware and matched software among the elements for achieving Internet of Things or information/data exchange, and which can be understood by a person with ordinary knowledge in the art.

An interactive platform system according to the present invention includes a processing module, an image-playing equipment, a physically-operated equipment, a platform database and a platform module. The processing module includes at least a processor. The image-playing equipment is coupled with the processing module to receive a control instruction from the processing module and generate a corresponding image. The physically-operated equipment is coupled with the processing module for a user to input a corresponding instruction or motion. The platform database is coupled with the processing module and includes a character database, a scene database and an object database, respectively for providing character information, scene information and object information for the image-playing equipment to respectively generate a virtual character image, a scene image and a virtual object image. The platform module is coupled with the processing module and includes a scene module. The scene module is coupled with the platform database to generate a corresponding scene image. The scene module includes a communication scene, which has a public area and a limited area within the public area defined in an interface arrangement thereof. When a virtual character of the user is in the public area, an information transmitted by the user is public. When the virtual character of the user is in the limited area, the information transmitted by the user is only receivable by corresponding virtual characters of other users who are in the limited area at the same time.

Therefore, the interactive platform system of the present invention, by configuring the limited area within the public area though interface arrangement of the communication scene, allows users to enter the range of the limited area from the public area when private communications are required, realizing fast conversion between the respective functions of public and non-public communications.

In an example, the interactive platform system further includes a verification device for detecting recognizable biological information of the user. The platform module further includes a log-in module for the user to verify his or her identity to complete a log-in procedure of the interactive platform system. The platform database further includes a user database having a verifying information database for saving verification information of each user for logging in the interactive platform system, and the verification information includes the recognizable biological information of the user. The verification device, the processing module, the verifying information database and the log-in module are coupled with each other, when the user has the biological information detected by the verification device, the processing module receives and determines whether the biological information detected by the verification device is identical to the biological information in the verifying information database. When the processing module determines the biological information detected by the verification device and the biological information in the verifying information database are identical, the processing module sends a corresponding control instruction to the log-in module to activate the log-in module to complete the log-in procedure of the user. Thus, through the collaborative operation of the verification device, the processing module, the verifying information database and the log-in module, fast verification of user identity and convenient log-in can be achieved.

In an example, the interactive platform system further includes a verification device for detecting recognizable biological information of the user. The platform module further includes a character module coupled with the character database to display multiple prebuilt virtual characters through the image-playing equipment for the user to select. The platform database further includes a user database having a verifying information database and a preferred setting, with the verifying information database saving verification information of each user for logging in the interactive platform system, and the verification information including the recognizable biological information of the user. The preferred setting saves a predetermined association information, which records the choices of each user from the character database. The verification device, the processing module, the verifying information database, the character module and the preferred setting are coupled with each other, when the user has the biological information detected by the verification device, the processing module receives and determines whether the biological information detected by the verification device is identical to the biological information in the verifying information database. When the processing module determines the biological information detected by the verification device and the biological information in the verifying information database are identical, the processing module sends a corresponding control instruction to the character module to load in the predetermined association information saved in the preferred setting, to correspondingly link to the character database to load in a corresponding virtual character. Thus, through the collaborative operation of the verification device, the processing module, the verifying information database, the character module and the preferred setting, fast verification of user identity and automatic loading of preferred virtual character can be achieved.

In an example, the interactive platform system further includes a verification device for detecting recognizable biological information of the user. The scene module further includes a user scene providing each user a corresponding personal space for the user to select one or more of corresponding scene information and object information from the platform database. The platform database further includes a user database having a verifying information database and a preferred setting, with the verifying information database saving verification information of each user for logging in the interactive platform system, and the verification information including the recognizable biological information of the user. The preferred setting saves a predetermined association information, which records the choices of each user from the corresponding user scene. The verification device, the processing module, the verifying information database, the scene module, the platform database and the preferred setting are coupled with each other, when the user has the biological information detected by the verification device, the processing module receives and determines whether the biological information detected by the verification device is identical to the biological information in the verifying information database. When the processing module determines the biological information detected by the verification device and the biological information in the verifying information database are identical, the processing module sends a corresponding control instruction to the scene module to load in the predetermined association information saved in the preferred setting, to correspondingly link to the platform database to load in corresponding user scenes. Thus, through the collaborative operation of the verification device, the processing module, the verifying information database, the scene module, the platform database and the preferred setting, fast verification of user identity and automatic loading of preferred settings can be achieved.

In an example, the interactive platform system further includes a verification device and an external unit. The verification device is configured for detecting recognizable biological information of the user. The external unit includes an external processing module and an external user database. The external user database has an external verification dataset and an external personal dataset. The external verification dataset saves verification information of each user for logging in the external unit, and the verification information includes the recognizable biological information of the user. The external personal dataset includes external personal data of each user. The platform database includes a user database. The external processing module, the verification device, the external user database and the user database are coupled with each other, when the user has the biological information detected by the verification device, the external processing module receives and determines whether the biological information detected by the verification device is identical to the biological information in the external verification dataset. When the external processing module determines the biological information detected by the verification device and the biological information in the external verification dataset are identical, the external processing module sends a corresponding control instruction to send the external personal data corresponding to the user of the external personal dataset to the user database of the interactive platform system. Thus, through the collaborative operation of the external processing module, the verification device, the external user database and the user database, fast verification of user identity and information/data association and conversion between different platform systems can be achieved.

In an example, the platform database further includes audio and video information and graph and text information. The scene module further includes a lecture scene. The lecture scene has an area provided with a lesson content displaying area, and the lesson content displaying area is coupled with the platform database to display the audio and video information, the graph and text information and the object information that is required to be utilize. Thus, through the collaborative operation of the lecture scene and the platform database, the lesson content displaying area is configured for displaying various lesson contents (audio and video, graph and text, or object) to make the user exposed to diverse learning contents, thereby increasing lecturing effect.

In an example, the scene module further includes a lecture scene. The lecture scene has several areas provided with seat areas. When the user appoints a corresponding seat area through the physically-operated equipment or moves the corresponding virtual character to the corresponding seat area, the virtual character forms a temporary binding with the seat area, so that a position of the virtual character is fixed at the corresponding seat area until the temporary binding is released. Thus, through binding the virtual character and the selected seat area in the lecture scene, the simulated environment is closer to an actual lecture in the reality, thereby increasing lecturing effect.

In an example, the scene database further includes a livestream scene. The livestream scene has an area provided with a video displaying area, and the video displaying area is configured for playing videos on the internet and reflecting immediate reactions and messages from the user synchronously. Thus, through playing videos from the internet and reflecting immediate reactions and messages from the user synchronously in the video displaying area, the users can better enjoy the immediate interaction in the livestream scene.

In an example, the corresponding scene image is generated by point cloud technology. Thus, the generated virtual scene can highly simulate the actual environment in the reality.

An educational metaverse interactive platform system according to the present invention includes the interactive platform system as mentioned above and further includes at least one of a material module, a student module, a teacher module and a management module. The student module, the teacher module and the management module are coupled with a respective user database, and the user data in the respective user database are categorized into a student identity, a teacher identity and a manager identity. The material module is configured for coupling with other platform systems to load in all types of files that can be used as educational resources. The files that can be used as educational resources include at least one of a document file, an image file and a video file. The student module is configured for saving activity record participated by a user categorized into the student identity as a corresponding learning portfolio. The activity record includes a name of the activity and further includes at least one of a starting time, a device used, an active time length and a total usage time. The teacher module is configured for creating activities by a user categorized into the teacher identity or correlating and displaying all the portfolios of the users categorized into the student identity who have participated in the activity the user categorized into the teacher identity has held. The management module is configured for users categorized into the manager identity to inspect the portfolio of the user categorized into the student identity, the activity of the user categorized into the teacher identity, or usage of the physically-operated equipment.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
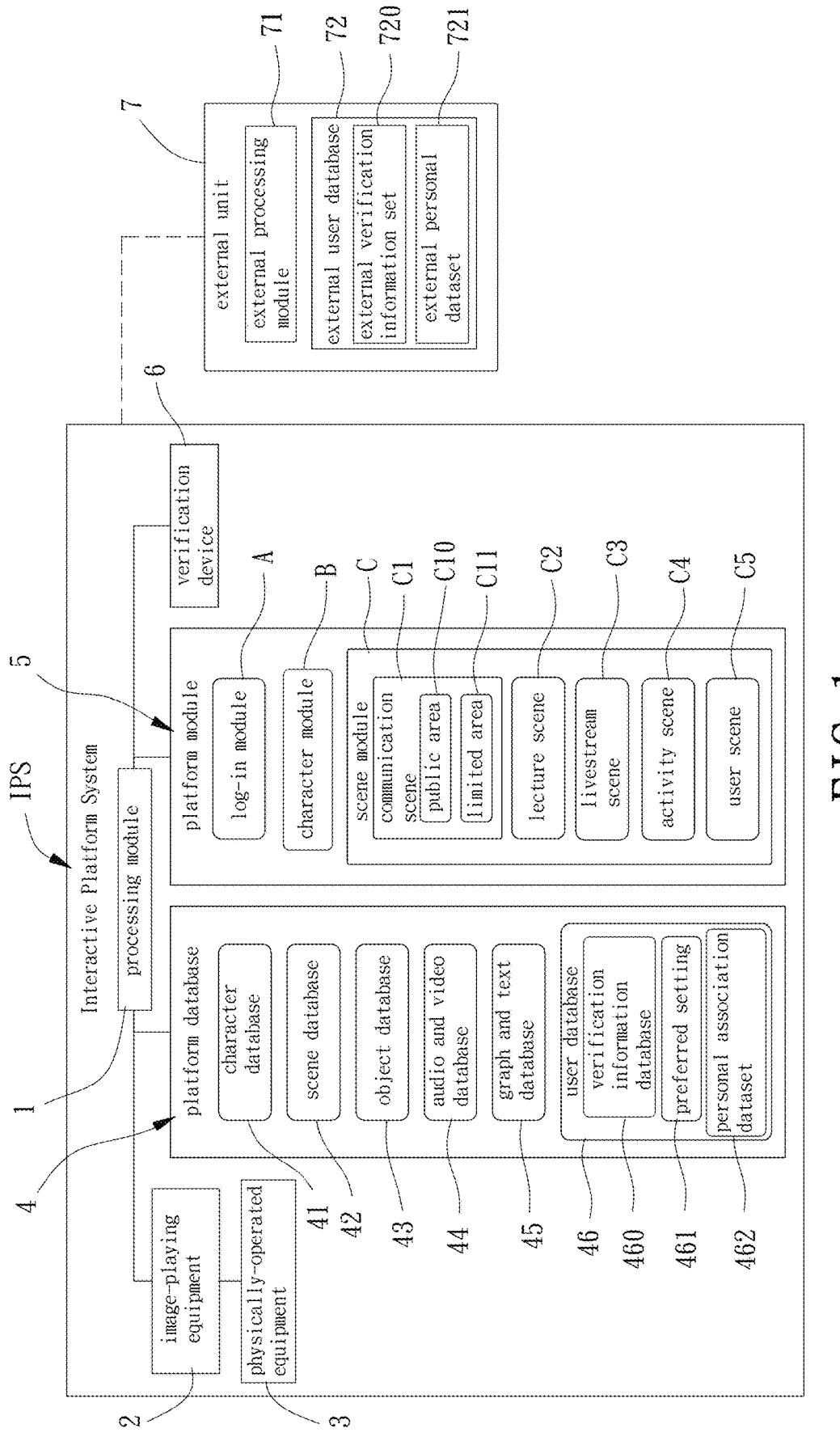
FIG. 1 is a block diagram showing a preferred embodiment of the interactive platform system according to the present invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

FIG. 1 shows a preferred embodiment of the interactive platform system IPS according to the present invention, in order to provide a user with a visional image, especially an immersive visional image that allows the users to enter a Meta Universe/Cyber-physical Integration/Virtual Reality scene. The interactive platform system IPS includes a processing module 1, an image-playing equipment 2, a physically-operated equipment 3, a platform database 4, a platform module 5, optionally an verification device 6, and optionally an external unit 7. The processing module 1 is coupled to the image-playing equipment 2, the physically-operated equipment 3, a platform database 4, the platform module 5, optionally the verification device 6, and optionally the external unit 7, respectively.

The processing module 1 includes at least one processor, such as a Central Processing Unit (CPU) and/or a Graphic Processing Unit (GPU) commonly used in a computer or a server system. The processing module 1 is configured for receiving, transmitting, calculating and/or sending control instructions to the corresponding coupled unit. Units coupled with the processing module 1 includes the image-playing equipment 2, the physically-operated equipment 3, the platform database 4, the platform module 5, and one or more of the verification device 6 and the external unit 7.

The image-playing equipment 2 includes a monitor and is coupled with the processing module 1 to receive the control instruction to generate corresponding images. More specifically, the monitor is configured for generating 2-dimensional images or 3-dimensional images. Especially in an application of virtual reality, the monitor is configured for generating 3-dimensional images. It should be noted that the image-playing equipment 2 can be carried out by known technology and the detailed description is omitted here.

The physically-operated equipment 3 is coupled with the processing module 1 and is provided for users to input corresponding instructions or motions. For example, the physically-operated equipment 3 may include one or more information inputting units, such as a keyboard, a mouse, an audio input device (like a microphone as an input unit for verbal instructions) and a motion-detecting unit. The motion-detecting unit may be, for example, a sensing circuit using the gyroscope principle, to detect the change in the positions, directions, velocities and/or accelerations of the user. Optionally, the motion-detecting unit may further include a depth camera or an infrared sensor for obtaining the real-time detailed information of the postures of the users.

Particularly, the physically-operated equipment 3 may be, for example, head wear VR glasses that at least support Oculus/Meta Quest series, HTC Vive series or other VR glasses on the market. However, the present invention is not limited to the abovementioned VR glasses. Other VR glasses with different brands or different types (such as the Galaxy Gear series, the PlayStation VR series and the Apple Vision Pro series) may be included as well. Under these circumstances, the image-playing equipment 2 can be integrated with the physically-operated equipment 3. Optionally, the physically-operated equipment 3 may be a controller, such as a controller paired with the aforementioned VR glasses on the market, or a controller that may be used independently. Optionally, the physically-operated equipment 3 may be an image-detecting device and is configured for detecting the change of motions within a specific region (like the technology Nintendo applied in their game console Wii). Optionally, the physically-operated equipment can be equipped on the limbs or the body parts of the users to detect the change of postures of their body parts (including one or more fingers, palms, arms, feet, legs and so on). Noteworthily, the physically-operated equipment 3 can be carried out by known technology and the detailed description is omitted here.

The platform database 4 is coupled with the processing module 1, and is configured for providing all types of data for the basis of the images generated by the image-playing equipment 2. Particularly, the platform database 4 includes at least one of the following: a character database 41 (for providing information of characters), a scene database 42 (for providing information of different scenes), an object database 43 (for providing information of different objects), an audio and video database 44 (for providing audio and video information) and a graph and text database 45 (for providing graph and text information), such that the platform database may respectively provide the image-playing equipment 2 a corresponding virtual character image, a corresponding scene image, a corresponding object image, a corresponding information from the content of the video and/or audio, and a corresponding information from the content of the graph and/or text. The character database 41 includes a plurality of pre-built character information. Different character information provides different appearance in the visual image (such as in height, slimness, face, outfit and their relative location), and may generate corresponding images of the virtual characters by the image-playing equipment 2. The scene database 42 includes plural pre-built scene information, which may be understood as space information and includes detailed spatial shape, the dimension of the corresponding spatial shape (including length, width and height), color and the corresponding coordinate value, and may generate the corresponding scene image through the image-playing equipment 2. Preferably, a pre-built scene information similar to the reality may be generated through point cloud technology. The object database 43 includes several pre-built object information. The object database 43 includes detailed shape of the object, the dimension corresponding to the object shape (including length, width and height), color and the corresponding coordinate value, and may generate images (especially 3D images of which the directions may be adjusted) of the corresponding virtual objects through the image-playing equipment 2. The images (virtual object) generated by the object information include images that is corresponding to the living body or nonliving body in the real world, and customized object images (such as objects in a cartoon or an anime). The audio and video database 44 includes pre-built video-only information (such as video files with no sound), audio only information and/or video and audio mixed information (such as typical video files with sound). The graph and text database 45 includes pre-built text files or graph file. Noteworthily, the platform database 4 can be carried out by known technology and the detailed description is omitted here.

Preferably, the platform database 4 may further include a user database 46, which includes a verification information database 460, a preferred setting 461, and a personal association dataset 462. The verification information database 460 is configured for saving verify information when logging in the interactive platform system IPS for each user. The verify information includes accounts and passwords the users set or unique and recognizable biological information (such as fingerprint, iris or facial features), but is not limited in this regard. The preferred setting 461 is configured for saving a predetermined association information, which is for recording at least one of the character database 41, the scene database 42, the object database 43 and optionally the personal association dataset 462 (as a predetermined or preferred setting) for an individual user. The personal association dataset 462 includes external character data or external object data loaded from an external user database 72 of an external unit 7 by individual users. The external character data and object data are respectively virtual characters and virtual objects with external exclusivity that may be chosen and applied in the metaverse scene (virtual world) in the present invention by users, which are different from the built-in character database 41 and object database 43. The "external exclusivity" indicates the ownership or right to use to an external personal data for a single user, and may be understood as "binding" or "pairing" in the technical field of the present invention, especially to the association between data that is composed of digital messages and the sole data for recognition corresponding to real-life users. In general, the external character data or external object data are virtual character and virtual object usually acquired only under a specific condition, as a symbolization of the users being dedicated or capable in a way, to bring sense of fulfillment or nostalgia to the users. Descriptions of the personal association dataset 462 loading the corresponding data from an external unit 7 will follow in this disclosure.

The platform module 5 is coupled with the processing module 1, and includes at least one of a log-in module A, a character module B and a scene module C. The log-in module A includes a window interface having at least two input boxes for the account and the password, respectively, for the users to type in their corresponding account and password through the physically-operated equipment 3 to complete/pass through the log-in procedure, and the window interface may be displayed by the image-playing equipment 2. Noteworthily, the window interface can be carried out by known technology and the detailed description is omitted here.

The character module B includes a character-selecting interface, which is coupled with the character database 41 directly or indirectly, and may display the plurality of pre-built virtual characters on the image-playing equipment 2, such that the user may select one of the plurality of pre-built virtual characters through the physically-operated equipment 3 to generate a virtual character that is being controlled by the user. Noteworthily, the character-selecting interface can be carried out by known technology and the detailed description is omitted here.

The scene module C is directly or indirectly coupled with the scene database 42 of the platform database 4, and may optionally be coupled with at least one of the character database 41, the object database 43, the audio and video database 44 and the graph and text database 45, to generate corresponding scene images. The scene images may be displayed independently through the image-playing equipment 2 or along with the virtual character of a user in the corresponding scene images. When the image-playing equipment 2 display the virtual character of a user in the corresponding scene, the processing module 1 would, according to the instruction or motion of the operation to the physically-operated equipment 3 by a user, make the virtual character in the corresponding scene image move synchronously or execute a predetermined function of the scene information. More specifically, in the process of making the virtual character move synchronously, the processing module 1 would calculate the change of the relations in terms of sizes or coordinates between the virtual character of a user and the scene image, so the image-playing module 2 may provide images for the users from the first person perspective. However, the visual effects provided is not limited to the first person perspective.

The interactive platform system IPS of the present invention, through the integration of the processing module 1, the image-playing module 2, the physically-operated equipment 3, the platform database 4 and the platform module 5, enable users to become the corresponding virtual character in a virtual world (the corresponding scene images), and make the virtual character move synchronously in the virtual world according to the instructions or motions of a user in the reality, thereby providing the effect of the combination of the reality and the virtual world. Particularly, when the applied scene information is generated by point cloud technology, the users in the virtual world may sense a scenery (scenes) in the reality as if having been to the exact location. Noteworthily, generating corresponding scene images and displaying virtual characters in the corresponding scene images can be carried out by known technology and the detailed description is omitted here.

The scene module C includes one or more of a communication scene C1, a lecture scene C2, a livestream scene C3, optionally an activity scene C4 and optionally a user scene C5. Each scene has a different interface arrangement and functions so the users are able to conduct diverse activities in different scenes, and would thus become more devoted in the atmosphere, activity, or incident of the current scene.

Figure 2:
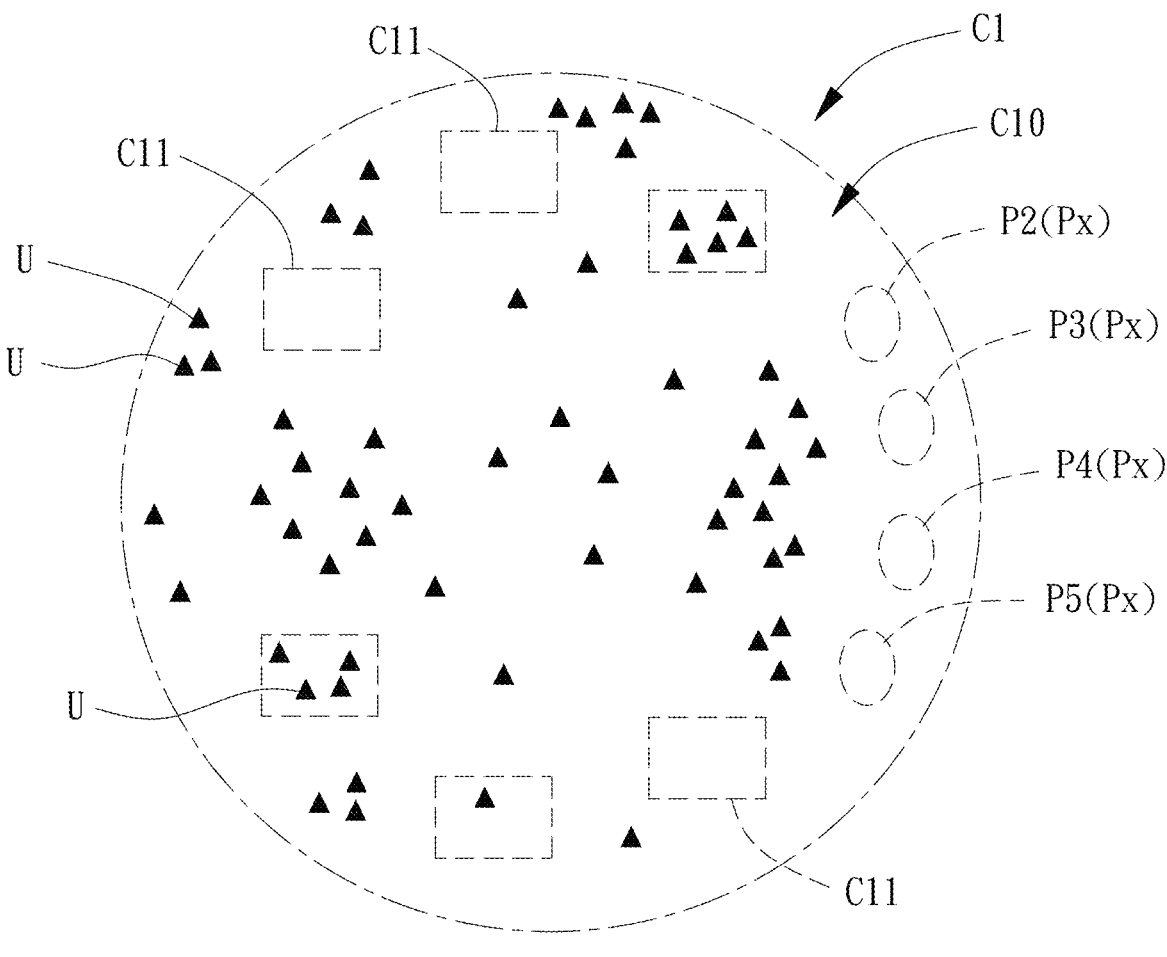
FIG. 2 is a schematic diagram showing the interface arrangement of the communicational scene according to the present invention.

FIG. 2 shows an example of the communication scene C1 being arranged under a two-dimensional structure (like a top view). The communication scene C1 is basically a public area C10 altogether; the triangular marks indicate virtual characters U of different users (locating in different locations of the public area C10); rectangular areas indicate the limited areas C11 in the public area C10. Oval areas indicate passages Px to different scenes. Noteworthily, the figures and areas with different shapes, quantities and positions are merely used for illustrating different features conveniently and making the content of the present invention more comprehensible, and the present invention is not limited thereto.

More specifically, the public area C10 of the communication scene C1 is provided for all users to have general interaction (like a square or a plaza in the reality), so the users may feel at ease and broad-minded. In other words, when a virtual character U of a user is in the public area C10, the information it transmitted (the audio messages it sent, the behavior, or the data it sent) are all public and accessible to other users. At least one limited area C11 is defined in the public area C10, and the virtual character U controlled by the users may basically enter and exit between the public area C10 and the limited area C11 freely. When a virtual character U of a user is in the limited area C11, the information it transmitted may only be received by the virtual characters of other users that is in the same limited area C11 at the same timepoint. Optionally, the user of the virtual character U that first enters the limited area C11 has the power of managing the limited area C11 and may select virtual characters of other users to enter/exclude virtual characters of other users from entering the limited areas C11. In this case, virtual character U of user who does not have the authorization may not enter and exit freely between the public area C10 and the unauthorized limited area C11.

Optionally, the public area C10 of the communication scene C1 has at least one passage Px. In the example shown in FIG. 2, the at least one passage Px includes a lecture scene passage P2, a livestream scene passage P3, an activity scene passage P4 and a user scene passage P5. The lecture scene passage P2, the livestream scene passage P3, the activity scene passage P4 and the user scene passage P5 are configured for sending/switching the users to a lecture scene C2, a livestream scene C3, an activity scene C4 and a user scene C5 respectively. For instance, when the user clicks on/selects the corresponding passage Px through the physically-operated equipment 3, or moves the corresponding virtual characters U and let the virtual character enter or go through the passage Px, the transmission will be activated. Similarly, the lecture scene C2, the livestream scene C3, the activity scene C4 and the user scene C5 may each include a communication scene passage P1 for users to be sent back to the communication scene C1.

Figure 3:
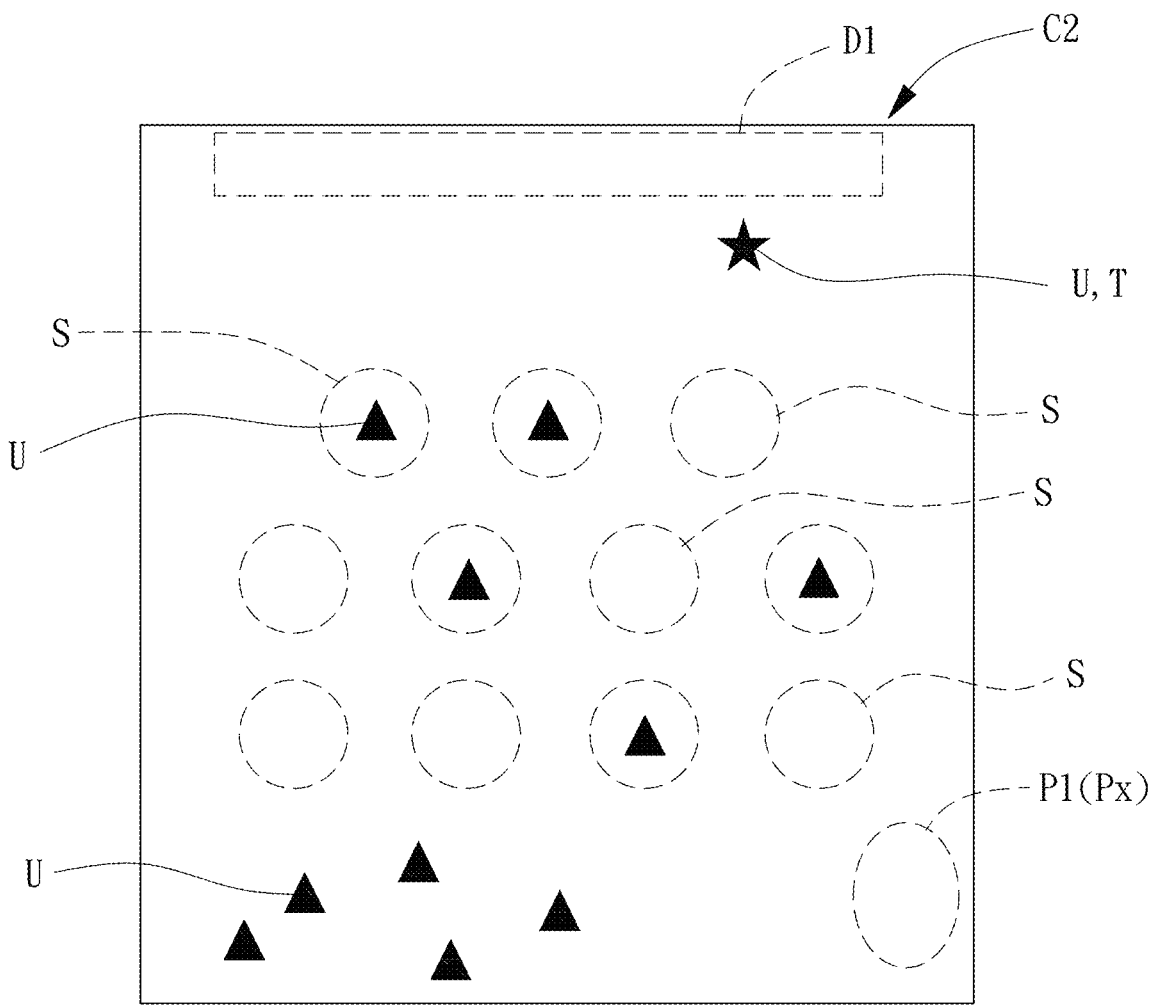
FIG. 3 is a schematic diagram showing the interface arrangement of the lecture scene according to the present invention.

FIG. 3 shows an example of the lecture scene C2 being arranged under a two-dimensional structure. In the lecture scene C2 in FIG. 3, the triangular marks indicate the position of the virtual characters U of different users; the star mark indicates the position of the virtual character U of a specific user as the lecturer T; the rectangular area indicates the lesson content displaying area D1; the circular areas indicate the seats S binding to the virtual characters U of users; the oval area indicates communication scene passage P1 for transmitting to the communication scene C1, which is also a type of the passage Px. Noteworthily, the figures and areas with different shapes, quantities and positions are merely used for illustrating different features conveniently and making the content of the present invention more comprehensible, and the present invention is not limited thereto.

The lecture scene C2 provides a scene particularly for users to learn and be lectured (like a classroom or a lecture hall in reality), so the users may concentrate and dedicate to learning. In addition, the lecture scene C2 also specifically grants the user of the lecturer T a right to guide the learning activity. The lesson content displaying area D1, set inside an area of the lecture scene C2, is configured for displaying materials for the lessons, such as object information, audio and video information (including audio and/or video data) or graph and text information (including graph and/or text data) that are required and may be loaded from the object database 43, the audio and video database 44, or the graph and text database 45.

Several areas in the lecture scene C2 are provided with seat areas S. When users click on/select the corresponding seat through the physically-operated equipment 3, or move the corresponding virtual character U to the corresponding seat area S, the virtual character U and the seat area S would form a temporary binding, making the position of the virtual character U fixed at the seat area S until the temporary binding is relieved. Optionally, each seat area S has corresponding virtual monitors (not shown) to display contents of the lessons in the lesson content displaying area D1 synchronously for the users.

Figure 4:
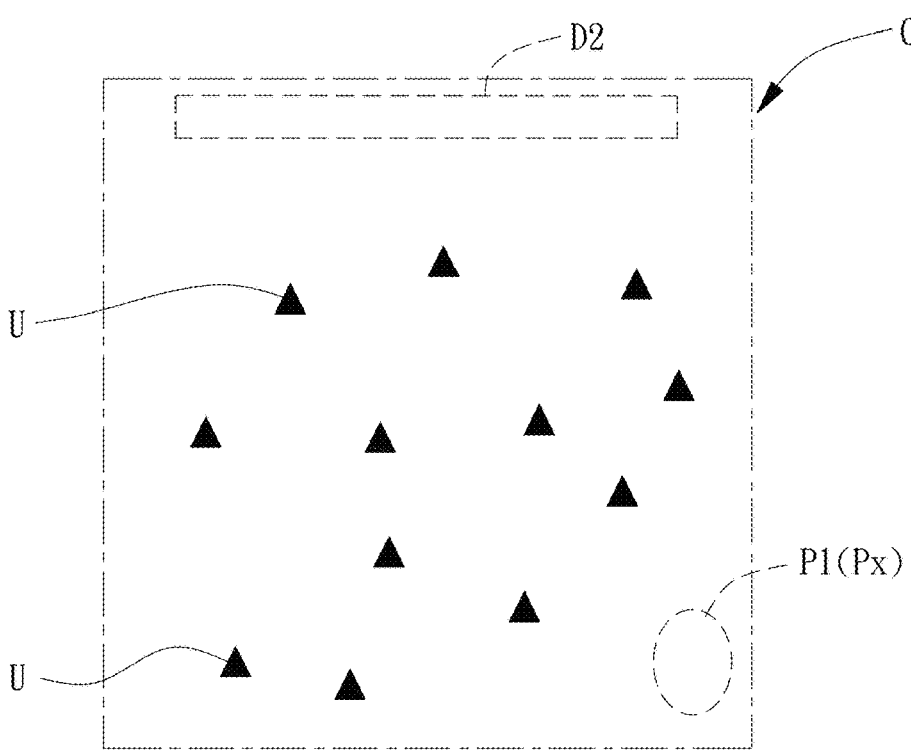
FIG. 4 is a schematic diagram showing the interface arrangement of the livestream scene according to the present invention.

FIG. 4 shows an example of the livestream scene C3 being arranged under a two-dimensional structure, to better illustrate the technical features of the livestream scene C3. In the livestream scene C3 in FIG. 4, the triangular marks indicate the positions of virtual characters U controlled by different users; the oval area indicates communication scene passage P1 to communication scene C1. Noteworthily, the figures and areas with different shapes, quantities and positions are merely used for illustrating different features conveniently and making the content of the present invention more comprehensible, and the present invention is not limited thereto.

The livestream scene C3 is a scene particularly provided for users to watch a livestream, especially a scene that enables multiple users to be in the same scene so the users may share their feelings and thoughts toward the content of the livestream immediately. The users may also give some feedbacks to the streamer immediately, which may optionally be reflected on the livestream as an interactive effect. An area of the livestream scene C3 is provided with a video displaying area D2, and the video displaying area D2 is configured for playing videos streamed on the internet (especially livestreams). In addition, in the livestream scene C3, the feedback from the virtual character U of the user, including voice messages or typed text messages, may be reflected on the video displaying area D2 in the text form to increase the diversity of the interactive mode (except for voice chat) and make the livestream more entertaining. The function of converting voice messages into text messages may be carried out by known technology and is thus be omitted in the present disclosure.

Figure 5:
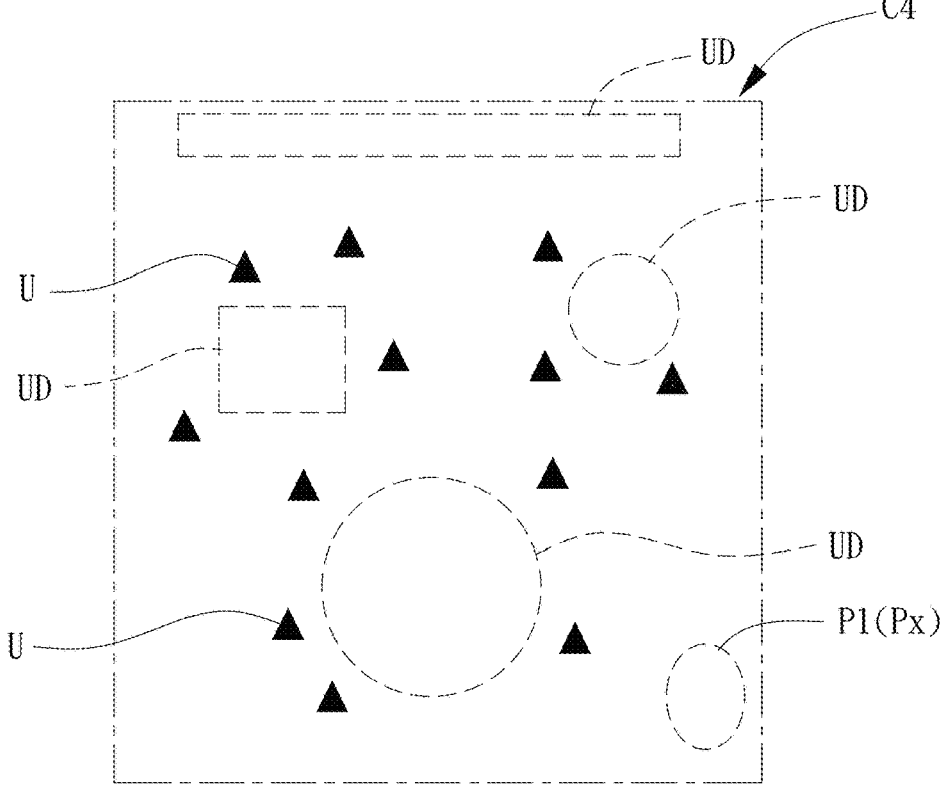
FIG. 5 is a schematic diagram showing the interface arrangement of the activity scene according to the present invention.

FIG. 5 shows an example of the activity scene C4 being arranged under a two-dimensional structure, to better illustrate the technical features of the activity scene C4. The activity scene C4 provides a scene particularly for users to conduct different theme activities (said theme activities are similar to hobbies, leisure activities, talents, or sports, such as jazz drum lectures/practices, watching movie, playing golf, yoga classes, etc.), especially that for multiple users to be in one scene, so that the user may interact with other users while doing activities, resulting in a positive sense of bonding. Since that the theme activities may vary a lot and be diverse, the activity scene C4 includes at least one user defined area UD (corresponding to the rectangular areas and circular areas in FIG. 5, while different areas with different sizes and shapes indicate the user defined area UD varies). The user defined area UD may be coupled with/connected to one or more of the object database 43, the audio and video database 44 and the graph and text database 45, to fulfill the theme activity of the activity scene C4 and install corresponding virtual objects.

Figure 6:
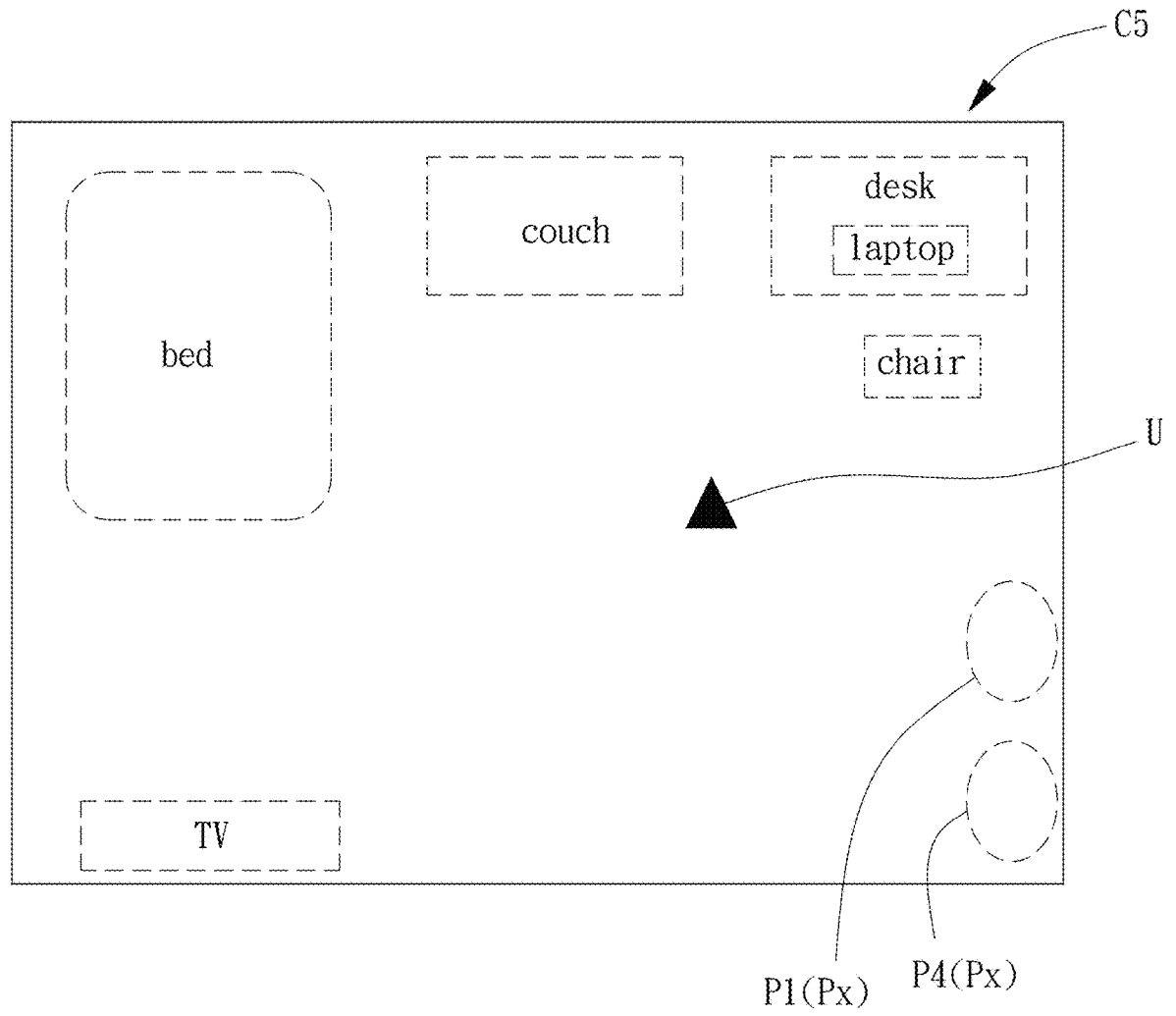
FIG. 6 is a schematic diagram showing the interface arrangement of the user scene according to the present invention.

FIG. 6 shows an example of the user scene C5 being arranged under a two-dimensional structure, to better illustrate the technical features of the user scene C5. The user scene C5 provides a scene particularly for users to manage their own ideal personal space with one or more of the scene information, object information, audio and video information or graph and text information loaded from the platform database 4 by the user, especially the available scene information and the available object information. The user may optionally load in available virtual objects (corresponding to the objects with external exclusivity) from the external user database 72. In the user scene C5, the rectangular areas indicate the available objects from the object database 43 or the objects with external exclusivity from the external user database 72, including virtual objects such as beds, televisions, couches, desks, laptops and chairs. Oval areas indicate passages Px to different scenes, and the types of passages may be chosen based on the user's preference. For example, in FIG. 6, the passages arranged are the communication scene passage P1 and the activity scene passage P4.

Noteworthily, in the example shown in FIG. 6, the arrangement may be saved in the preferred setting 461 by the corresponding user, so the next time when the user logs in the interactive platform system IPS of the present invention, the arrangement of the user scene C5 would be loaded automatically. More specifically, the predetermined associated information saved in the preferred setting 461 may also include the choice of at least one of the scene database 42, the object database 43 and optionally the personal association dataset 462 (as a default or preferred setting). Noteworthily, the figures and areas with different shapes, quantities and positions are merely used for illustrating different features conveniently and making the content of the present invention more comprehensible, and the present invention is not limited thereto.

Noteworthily, the fulfillment of the functions and techniques of the interactive platform system IPS of the present invention requires the user to control the virtual character of the user in the image-playing equipment 2 through the physically-operated equipment 3, and make the virtual character give lessons (as a lecturer), make presentations, participate in classes, chat, discuss in a meeting, operate all kinds of virtual objects, watch livestreams and take other actions that simulate behaviors in the reality, and may all be carried out by known technology. Specifically, switching scenes through passages Px, granting virtual objects, virtual scenes, and virtual character features different from those in the reality may also be carried out by known technology. Therefore, the fulfillment of the functions and techniques thereof is omitted here.

Noteworthily, one of the major contribution of the interactive platform system IPS of the present invention is the interface arrangement of the communication scene C1, including the public area C10 and the limited area C11 (as shown in FIG. 2), preferably with the limited area C11 surrounded by the public area C10. When the processing module 1 determines the virtual character U controlled by the user through the physically-operated equipment 3 is in the range of the limited area C11 or the public area C10, the image-playing equipment 2 corresponding to the user may only receive messages sent from corresponding virtual characters of other users in the respective same range. Particularly, when the virtual character U is at a different position, the confidentiality of the information sent differs accordingly. In other words, confidentiality in the public area C10 is lower (public and not restricted between specific people), while confidentiality in limited area C11 is higher (non-public and restricted between specific people). More specifically on the confidentiality, "public" means any user (whether in the same location or not) have access to the corresponding history of messages, while "non-public" means in general only users in the same location and at the same time may have access to the corresponding history of messages. Therefore, when two users need to communicate privately, they may move the corresponding virtual characters U from the public area C10 to the limited area C11.

Thus, both public and non-public (privacy-guaranteed) real-time interaction can be achieved in the same scene.

More specifically, in the communication scene C1 including the public area C10 and the limited area C11, determination of whether a virtual character U has moved to a corresponding area or not depends on the determination by the processing module 1 on whether the coordinates of the virtual character U lie within the range of the borderline coordinates of the corresponding area. The coordinates of the virtual character U is controlled by the users through the physically-operated equipment 3, while the processing module 1 switches a specific area (the public area C10 and the limited area C11) of a specific scene (the communication scene C1) in a virtual world accordingly. By sending control signals to the image-playing equipment 2 to generate corresponding video and audio, motions of the users in the real world (generated by the physically-operated equipment 3) may be synchronized to the virtual world and the sensation in the virtual world (generated by the image-playing equipment 2) may also be reflected synchronously to the real world, achieving the effect of integrating the real world and the virtual world.

Please refer to FIG. 1 again, the interactive platform system IPS may further include a verification device 6. The verification device 6 is a biological signal detecting device configured for detecting recognizable biological information that differs from user to user (such as fingerprint, iris or face features) to validate the user's identity. The verification device 6 is coupled with the processing module 1 and the verification information database 460 for verifying the user's identity. More specifically, a user may have his or her biological information detected through the verification device 6, received and compared by the processing module 1 to determine whether the biological information is identical to the biological information in the verification information database 460. When the processing module 1 determines that they are identical (defined as "successfully verifies the user's identity"), the processing module 1 may send corresponding control instruction to corresponding elements or modules, to activate the corresponding elements or modules to generate functions of verification. The functions of verification include quick log-in, loading in default character, loading in default user scene and loading in data with external exclusivity, all of which will be illustrated below.

In the circumstance where the function of verification is quick log-in, the verification device 6, the processing module 1, the verification information database 460, the log-in module A are coupled directly or indirectly. When successfully verifies the user's identity, the log-in module A is triggered to activate the function of quick log-in, making the user complete/pass the log-in process of the log-in module A.

In the circumstance where the function of verification is loading in default character, the verification device 6, the processing module 1, the verification information database 460, the character module B and the preferred setting 461 are coupled directly or indirectly, and may additionally be coupled with the character database 41 or the personal association dataset 462. In addition, the object database 43 or the personal association dataset 462 may be coupled optionally. When successfully verifies the user's identity, the character module B is triggered to activate the function of loading in default character by loading in the predetermined association information saved in the preferred setting 461 to correspondingly link to the character database 4 or the personal association dataset 462 to load in the corresponding virtual character. Optionally, the virtual character may wear corresponding virtual objects. Therefore, the predetermined association information may also include the corresponding object information to correspondingly link to the object database 43 or the personal association dataset 462 to load in corresponding virtual objects, such that the loaded in virtual character may wear corresponding virtual objects.

In the circumstance where the function of verification is loading in default user scene, the verification device 6, the processing module 1, the verification information database 460, the scene module C, the scene database 42 and the preferred setting 461 are coupled directly or indirectly, and may additionally be coupled with the object database 43 or the personal association dataset 462. When successfully verifies the user's identity, the scene module C is triggered to activate the function of loading in default user's scene by loading in the predetermined association information saved in the preferred setting 461 to correspondingly link to at least one of the scene database 42, the object database 43, the audio and video database 44, the graph and text database 45 and optionally the personal association dataset 462 to load in the corresponding user scene C5.

In the circumstance where the function of verification is loading in data with external exclusivity, the interactive platform system IPS of the present invention is further coupled with an external unit 7. The external unit may be another platform system or a device with corresponding external processing module 71 and the external user database 72. The external processing module 71 includes at least one processor and is coupled with the processing module 1. The external user database 72 is coupled with the external processing module 71 and further includes an external verification information set 720 and an external personal dataset 721. Similar to the verification information database 460, the external verification information set 720 has the verification information the user uses to log in the external unit 7 stored therein, especially the biological information of the respective users. The external processing module 71, the verification device 6 and the external user database 72 are coupled, such that the biological information of a user detected by the verification device 6 is received by the external processing module 71 and be determined whether it is identical to the biological information of the external verification information set 720 or not. When the external processing module 71 determines that they are identical (successfully verify the user's identity), the external processing module 71 may send control instructions to the corresponding elements or modules to execute corresponding functions, so the external personal data in the external personal dataset 721 may be sent and saved in the user database 46 (especially the personal association dataset 462) of the interactive platform system IPS.

Figure 7:
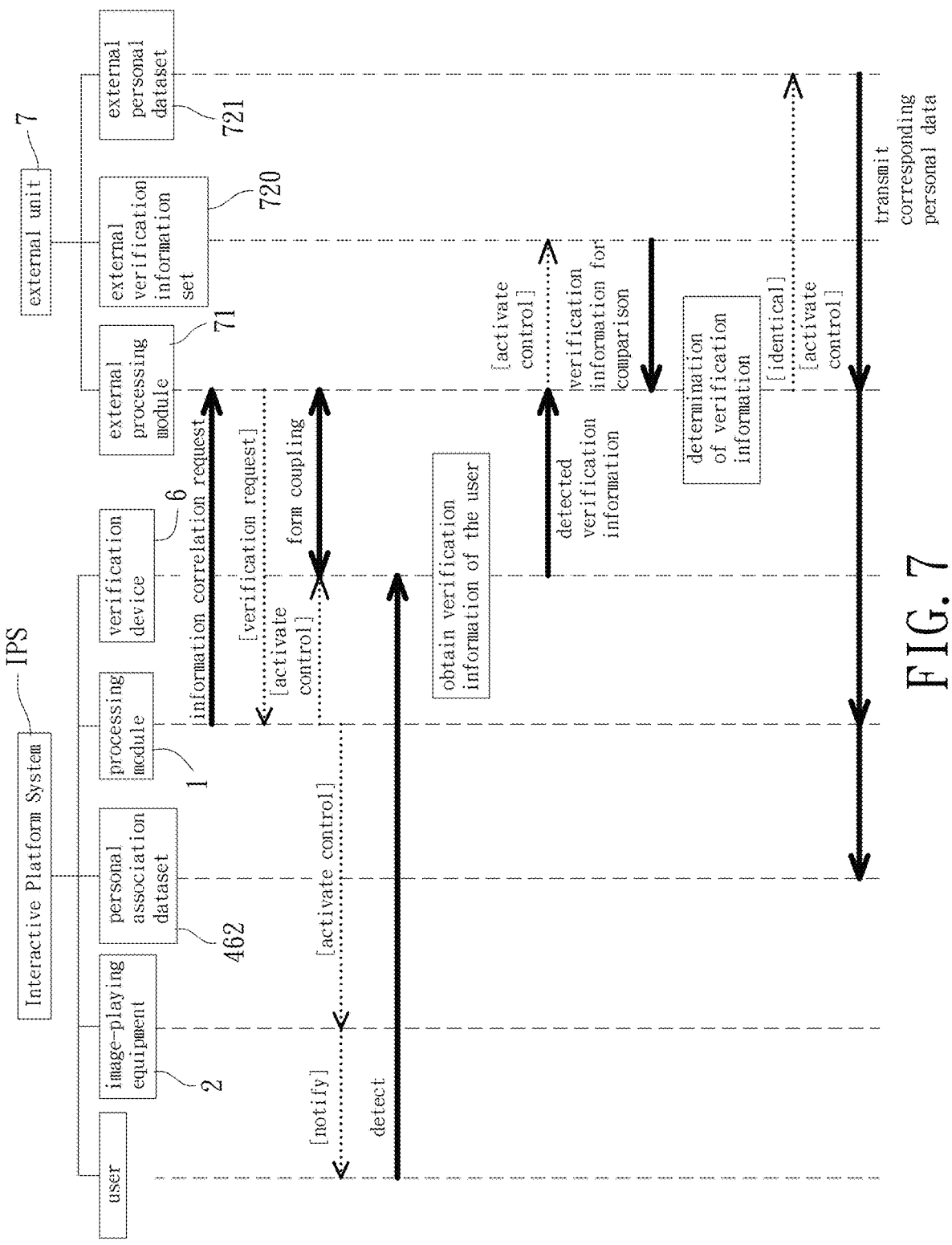
FIG. 7 is a schematic diagram of the collaborative operation relationship between elements when the interactive platform system according to the present invention is loading personal data from the external unit.

More specifically, FIG. 7 is a schematic diagram depicting the coupling and the information correlation among the elements/modules for illustrating an example of loading the external personal data. In the example, the collaborative operation of the elements includes the contents below:

1. The processing module 1 of the interactive platform system IPS sends an information correlation request to the external processing module 71 of the external unit 7.

2. The external processing module 71 is coupled with the physical verification device 6 after receiving the information correlation request from the external processing module 71. More specifically, the external processing module 71 sends a verification request to the processing module 1 after receiving the information correlation request. The physical verification device 6 is coupled with the external processing module 71 to verify the user's identity after the processing module 1 receives the verification request. Preferably, the processing module 1 sends notification signals corresponding to the verification request to the user's image-playing equipment 2 to notify the user to verify his or her identity with the physical verification device 6.

3. The physical verification device 6 detects the biological information of the user (acquire "detected verification information") and sends the biological information to the external processing module 71. The external processing module 71 receives the biological information saved in the external verification information set 720 (acquire "verification information for comparison") to determine whether the detected verification information is identical to the verification information for comparison by the external processing module 71.

4. When the external processing module 71 determines the detected verification information and the verification information for comparison are identical, the personal association dataset 462 receives and saves the external personal data (external personal character data or external personal object data) of the external personal dataset 721 corresponding to the user. Noteworthily, formats of character data or object data may vary from different platform systems. Thus, during the process of sending the external personal data from the external processing module 71 to the processing module 1 or the process of sending the external personal data from the processing module 1 to the personal association dataset 462, the external personal data may be converted into converted personal data with a format compatible to the interactive platform system IPS according to an information converting agreement between the two platform systems (the interactive platform system IPS and the external unit 7).

In an example of application (illustrative but not restrictive of the present invention), the external unit 7 may be a specific game platform. Users may acquire limited personal virtual objects or virtual characters (costumes) from the game platform under a certain condition and. In addition, through the collaborative operation of the elements including the interactive platform system IPS, the verification device 6 and the external unit 7, the personal virtual objects or virtual characters acquired from outside of the interactive platform system IPS may be loaded into the interactive platform system IPS for use therein.

Noteworthily, the verification information obtained through the verifying device 6 is preferably biological information of fingerprints or iris to ensure the effect of proving the identity of the user with high specificity. However, the verification information is not limited in this regard, and may include all verification means available in the current and future technology. For example, the verification information may be a facial feature of a user (facial recognition technology). The verification information may also be a verification code. In an example of application, such as an online transaction, when the user demands the credit card system (the external unit 7) to pay (obtain external personal data), the credit card system is activated to demand the user to send a verification code (verification information) through a cellphone (verification device 6) so the credit card system is authorized to proceed with the payment. The verification information may also be the user ID and the password.

Based on the above, the present invention further provides an educational metaverse interactive platform system by further including a material module, a student module, a teacher module, and a management module (not shown in the drawings) along with the above-mentioned interactive platform system IPS, to construct a virtual environment and system specifically for educational purpose. The student module, the teacher module and the management module are coupled with the user database 46, and the user data in the user database 46 may be categorized based on identities such as students, teachers and managers.

The material module is coupled with other platform system to load in all kinds of files that may be used as educational resources. The other platform system includes but is not limited to the external unit 7, and may be at least one of a platform, a system and a device (such as a server, a cloud database, a cellphone, a tablet or a computer). The files that may be used as educational resources may be all kinds of document files, image files and video files. The image files and video files may include both 2D and 3D data format. The material module, through direct coupling with other platform systems, load in information of the corresponding file to the target scene or saves/copies the to-be-loaded files in the platform database 4, especially the object database 43, the audio and video database 44 and the graph and text database 45.

The student module is provided for the users categorized as students to save their record of participation in activities in the virtual world as a corresponding learning portfolio, and the users categorized as students inspect watch their learning portfolio in a displaying interface to know their learning condition. The record of participation in activities includes a name of activity and may further include at least one of a starting time, a device used, an active duration, a total usage time. The name of activity is corresponding to an activity, a lesson, a material or a quiz the user participated or accessed. The starting time is the real time (say, 10:30, May 13, 2024) the user execute the content of the name of activity. The active duration is the time length of the user execute the content of the name of activity except for the idle time. The total usage time is the time length of the user execute the content of the name of activity from the beginning to the end. The information mentioned above may be presented with tables or charts. Especially the active duration and the total usage time may be shown with histograms or pie charts.

Optionally, the platform database 4 may further include an activity database (not shown), saved with all the activities (including any activities, lessons, quizzes, exams and tests). Each activity has a corresponding name of activity, and may be categorized into finished, on-going, not yet started and other states. The activity database may also show the activities a single user has chosen only, and the chosen activities may be further categorized into finished without participation, participated, on-going, not yet started and other states.

The teacher module is provided for users categorized as teachers to create corresponding activities/lessons for students to participate. The teacher module may include an activity scheduling module, an activity qualification module, an activity data module. The activity scheduling module is configured for checking whether other teachers have created an activity or whether there are spare classrooms/scenes (corresponding to the lecture scene C2, the livestream scene C3 or the activity scene C4) on a specific date in the future schedule, so the users categorized as teachers may decide the time and classroom for the to-be-offered activity. The activity qualification module is configured for determining the qualification for participating in the activity (such as requiring a certain ability, such as having preparatory activity completed or passing a specific exam), and may further for deciding whether the activity is opened to users from other schools or other institutions. The activity data module is provided for users categorized as teachers to upload lecture material to the object database 43, the audio and video database 44 and the graph and text database 45 for a scheduled activity in the virtual world (especially in the lecture scene C2, the livestream scene C3 or the activity scene C4). Particularly, the system may create/generate an activity folder for the required data of each corresponding activity, so the users categorized as teachers can make sure whether the lecture materials are all complete. Optionally, all the files/data in each activity folder corresponding to each activity may be set to be entirely or partially public, so the users categorized as students may preview the information related to the activity while selecting activities to understand the purpose and the contents of the activities and select suitable or preferred activities, leading to a better user's experience while selecting activities.

Optionally, the teacher module may further include an activity record module to correlate and display the basic information of the users categorized as students who has participated in the activity and the learning process during the activity, so the users categorized as teachers who created the activity can understand the learning condition of the students who participated, and adjust the contents of the activity or give specific students instructions accordingly to enhance the learning condition.

The management module is provided for users categorized as manager to, after logging in, view the portfolio of the users categorized as students and the activities created by the users categorized as teachers, respectively, for better managing the overall educational quality and learning condition. The management module may include a learning management module, a teacher management module, and an activity management module. The learning management module correlates and displays the basic information and portfolio of all the users categorized as students in the system, to understand the overall learning condition of all the students or the learning condition of a particular student. The teacher management module correlates and displays the basic information (including information like educational background, experience, certificates, qualifications, awards and honors, publications, projects participated, and/or specialties) of the user categorized as a teacher and the activity the user categorized as a teacher created, to understand the overall knowledge background and teaching condition of all teachers as a reference when assigning teachers or adjusting contents of the activities. The activity management module correlates and displays the history of all the activities that have been created for a user categorized as a manager to understand the overall activity-creating performance, or understand the learning condition (including the quantity of students, active time and performance in exams) of the students in a specific lesson. In particular, the activity management module may compare the learning data of lessons with similar types to observe whether different teachers lead to an obvious difference in the lecturing results, and further figure out the key to increasing lecturing results, so the teachers may improve their lecturing techniques.

Optionally, the management module may further increase a public equipment managing module to correlate and display the usage of the physically-operated equipment 3, where the usage includes information such as the starting time of each devices being used in participating activities (lessons or quizzes), active time, and total usage time, for the managers to understand the usage condition and frequency of the public physically-operated equipment 3.

In summary, the interactive platform system of the present invention, by configuring at least one limited area within the public area though interface arrangement, allows users to enter the range of the limited area from the public area when private communications (such as expressing opinions or transmitting information) are required, realizing fast conversion between the respective functions of public and non-public communications. In addition, through loading visual effects of corresponding scenes by point cloud technology, a virtual environment with high-fidelity may be realized, so the user may feel like as if experiencing the real world. Furthermore, through the interface arrangement of the lecturing scene, the virtual character of the corresponding user may form a temporary binding with the seat, so the positions of the virtual character and the seat may be the same, simulating classes/lectures in the reality and increasing participation and concentration of the user. Moreover, through the interface arrangement of the livestream scene, videos on the internet and the immediate reflected messages from the users may be displayed in the video displaying area synchronously, to increase the pleasure of immediate interactions of users in a livestream scene. Further, through the collaborative operation of the verification device and the interactive platform system, functions like quick log-in, loading in default characters, loading in default user scenes may be fulfilled, increasing the convenience in utilization and sense of personalization. Besides, through the collaborative operation of the verification device, the interactive platform system and the external unit, users may apply personal objects acquired from other platform systems in the present interactive platform system. Therefore, the present interactive platform system may enable not only the interaction between multiple users, but also the interaction with other platform systems (data interconnection). In addition, based on the interactive platform system of the present invention, the present disclosure further provides an educative metaverse interactive platform system, which can load in all types of educative resource files through a material module, enable users categorized as students to quickly understand their learning condition through a student module, enable users categorized as teachers to arrange activities and to view the portfolios of users categorized as students through a teacher module, and enable users categorized as managers to view the portfolios of students and the lecturing condition (created activities) or the usage of the public physically-operated equipment.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

What is claimed is:

1. An interactive platform system, comprising:
a processing module including at least a processor;
an image-playing equipment coupled with the processing module to receive a control instruction from the processing module and generate a corresponding image;

a physically-operated equipment coupled with the processing module for a user to input a corresponding instruction or motion;

a platform database coupled with the processing module and including a character database, a scene database and an object database, respectively for providing character information, scene information and object information for the image-playing equipment to respectively generate a virtual character image, a scene image and a virtual object image; and a platform module coupled with the processing module and including a scene module;

wherein the scene module is coupled with the platform database to generate a corresponding scene image;

wherein the scene module includes a communication scene, which has a public area and a limited area within the public area defined in an interface arrangement thereof;

wherein when a virtual character of the user is in the public area, an information transmitted by the user is public;

wherein when the virtual character of the user is in the limited area, the information transmitted by the user is only receivable by corresponding virtual characters of other users who are in the limited area at the same time;

wherein the user of the virtual character that first enters the limited area has the power of managing the limited area and be capable of selecting virtual characters of other users to enter or excluding virtual characters of other users from entering the limited areas.

2. The interactive platform system as claimed in claim 1, further comprising a verification device for detecting recognizable biological information of the user;

wherein the platform module further includes a log-in module for the user to verify his or her identity to complete a log-in procedure of the interactive platform system;

wherein the platform database further includes a user database having a verifying information database for saving verification information of each user for logging in the interactive platform system, and the verification information includes the recognizable biological information of the user;

wherein the verification device, the processing module, the verifying information database and the log-in module are coupled with each other, when the user has the biological information detected by the verification device, the processing module receives and determines whether the biological information detected by the verification device is identical to the biological information in the verifying information database;

wherein when the processing module determines the biological information detected by the verification device and the biological information in the verifying information database are identical, the processing module sends a corresponding control instruction to the log-in module to activate the log-in module to complete the log-in procedure of the user.

3. The interactive platform system as claimed in claim 1, further comprising a verification device for detecting recognizable biological information of the user;

wherein the platform module further includes a character module coupled with the character database to display multiple prebuilt virtual characters through the image-playing equipment for the user to select;

wherein the platform database further includes a user database having a verifying information database and a preferred setting, wherein the verifying information database saves verification information of each user for logging in the interactive platform system, and the verification information includes the recognizable biological information of the user;

wherein the preferred setting saves a predetermined association information, which records the choices of each user from the character database;

wherein the verification device, the processing module, the verifying information database, the character module and the preferred setting are coupled with each other, when the user has the biological information detected by the verification device, the processing module receives and determines whether the biological information detected by the verification device is identical to the biological information in the verifying information database;

wherein when the processing module determines the biological information detected by the verification device and the biological information in the verifying information database are identical, the processing module sends a corresponding control instruction to the character module to load in the predetermined association information saved in the preferred setting, to correspondingly link to the character database to load in a corresponding virtual character.

4. The interactive platform system as claimed in claim 1, further comprising a verification device for detecting recognizable biological information of the user;

wherein the scene module further includes a user scene providing each user a corresponding personal space for the user to select one or more of corresponding scene information and object information from the platform database;

wherein the platform database further includes a user database having a verifying information database and a preferred setting, wherein the verifying information database saves verification information of each user for logging in the interactive platform system, and the verification information includes the recognizable biological information of the user;

wherein the preferred setting saves a predetermined association information, which records the choices of each user from the corresponding user scene;

wherein the verification device, the processing module, the verifying information database, the scene module, the platform database and the preferred setting are coupled with each other, when the user has the biological information detected by the verification device, the processing module receives and determines whether the biological information detected by the verification device is identical to the biological information in the verifying information database;

wherein when the processing module determines the biological information detected by the verification device and the biological information in the verifying information database are identical, the processing module sends a corresponding control instruction to the scene module to load in the predetermined association information saved in the preferred setting, to correspondingly link to the platform database to load in corresponding user scenes.

5. The interactive platform system as claimed in claim 1, further comprising a verification device and an external unit; the verification device is configured for detecting recognizable biological information of the user;

wherein the external unit includes an external processing module and an external user database;

wherein the external user database has an external verification dataset and an external personal dataset;

wherein the external verification dataset saves verification information of each user for logging in the external unit, and the verification information includes the recognizable biological information of the user;

wherein the external personal dataset includes external personal data of each user;

wherein the platform database includes a user database;

wherein the external processing module, the verification device, the external user database and the user database are coupled with each other, when the user has the biological information detected by the verification device, the external processing module receives and determines whether the biological information detected by the verification device is identical to the biological information in the external verification dataset;

wherein when the external processing module determines the biological information detected by the verification device and the biological information in the external verification dataset are identical, the external processing module sends a corresponding control instruction to send the external personal data corresponding to the user of the external personal dataset to the user database of the interactive platform system.

6. The interactive platform system as claimed in claim 1, wherein the platform database further includes audio and video information and graph and text information;

wherein the scene module further includes a lecture scene;

wherein the lecture scene has an area provided with a lesson content displaying area, and the lesson content displaying area is coupled with the platform database to display the audio and video information, the graph and text information and the object information that is required to be utilize.

7. The interactive platform system as claimed in claim 1, wherein the scene module further includes a lecture scene;

wherein the lecture scene has several areas provided with seat areas, wherein when the user appoints a corresponding seat area through the physically-operated equipment or moves the corresponding virtual character to the corresponding seat area, the virtual character forms a temporary binding with the seat area, so that a position of the virtual character is fixed at the corresponding seat area until the temporary binding is released.

8. The interactive platform system as claimed in claim 1, wherein the scene database further includes a livestream scene;

wherein the livestream scene has an area provided with a video displaying area, and the video displaying area is configured for playing videos on the internet and reflecting immediate reactions and messages from the user synchronously.

9. The interactive platform system as claimed in claim 1, wherein the corresponding scene image is generated by point cloud technology.

10. An educational metaverse interactive platform system, which comprises the interactive platform system as claimed in claim 1 and further comprises at least one of a material module, a student module, a teacher module and a management module;

wherein the student module, the teacher module and the management module are coupled with a respective user database, and the user data in the respective user database are categorized into a student identity, a teacher identity and a manager identity;

wherein the material module is configured for coupling with an external platform system to load in an education resource;

wherein the educational resource includes at least one of a document file, an image file and a video file;

wherein the student module is configured for saving activity record participated by a user categorized into the student identity as a corresponding learning portfolio;

wherein the activity record includes a name of the activity and further includes at least one of a starting time, a device used, an active time length and a total usage time;

wherein the teacher module is configured for creating activities by a user categorized into the teacher identity or correlating and displaying all the portfolios of the users categorized into the student identity who have participated in the activity the user categorized into the teacher identity has held; and wherein the management module is configured for users categorized into the manager identity to inspect the portfolio of the user categorized into the student identity, the activity of the user categorized into the teacher identity, or usage of the physically-operated equipment.

* * * * *